3,477,013
HYDROSTATIC TRANSMISSION COUPLED STANDBY POWER SUPPLY
Peter B. Smith, Monroe, Conn., assignor to Dynamics Corporation of America, New York, N.Y., a corporation of New York
Filed June 5, 1967, Ser. No. 643,713
Int. Cl. H02k 7/02
U.S. Cl. 322—4               8 Claims

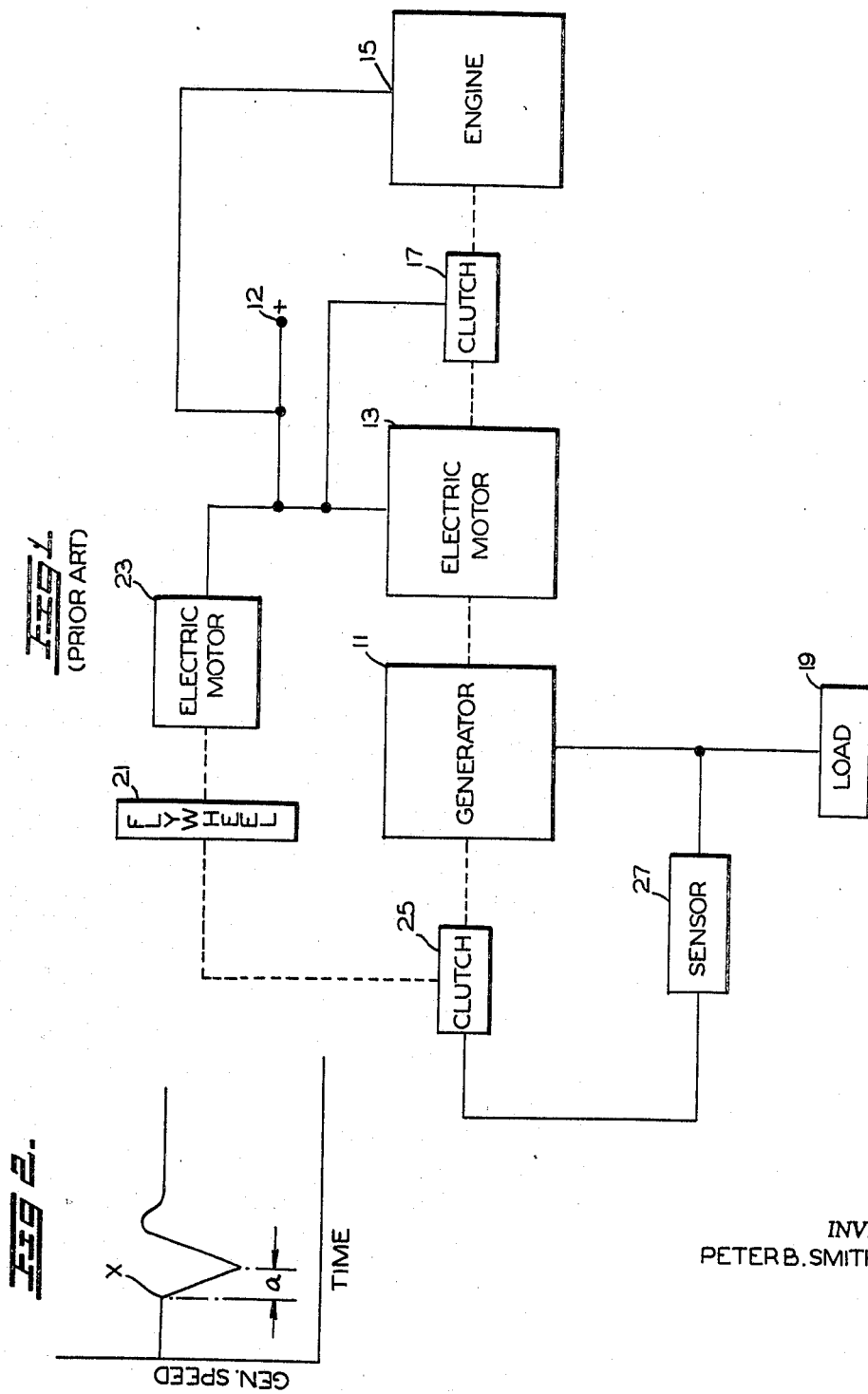

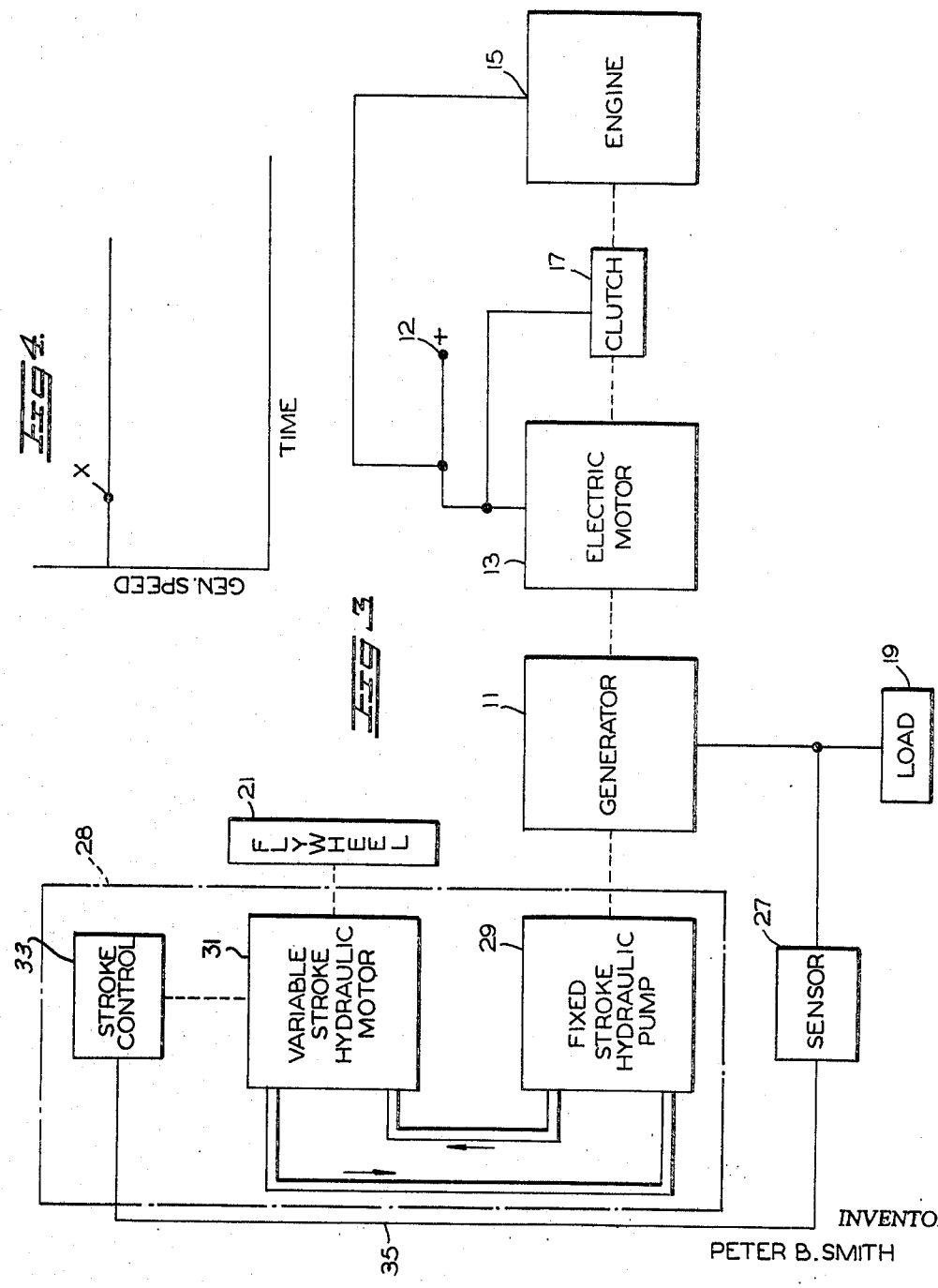

ABSTRACT OF THE DISCLOSURE

A standby generator having a flywheel storage system coupled to the generator by means of a hydrostatic transmission system.

---

This invention relates generally to a standby generating system and more specifically to a combined hydraulic-flywheel storage system for use with a standard standby generating system.

The basic standby generating system consists normally of a motor-generator set with the motor being coupled to a standard power source so as to provide the desired power supply to the system from the generator. Also, coupled to the generator is a standby engine, such as a diesel engine or an internal combustion engine, with the necessary connections being provided so as to start the standby engine upon the failure of the commercial power supply.

One of the problems involved with the basic standby power system is that there is a complete failure in the power supply, or substantially a complete failure, so that any equipment being operated thereby many malfunction during the transfer to the emergency system. Several methods have been devised in order to overcome this momentary power interruption. The best-known system relates to the use of a large flywheel which is driven by the generator so as to store energy while the system is operating normally. Upon failure of the power supply, the flywheel continues to rotate and, therefore, continues to drive the generator until the standby engine is energized and reaches a normal operating speed. Another system which has been proposed is to use a hydraulic system with pressure storage coupled to the generator so that a failure results in a hydraulic pump driving the generator during the period of time that it is required for the standby engine to attain the necessary speed.

An object of this invention is to combine the advantages of the hydraulic system with the flwheel system so as to obtain the greatest efficiency with the most economical equipment.

Another object of the invention is to provide a flywheel hydraulic system for use with the standby engine whereby the output speed or frequency of the generator may be maintained substantially constant during the changeover.

These and other objects will be better understood from the following description when taken in conjunction with the drawings wherein:

FIG. 1 is a schematic illustration of one known prior art system;

FIG. 2 is a graphic illustration of the operation of the system of FIG. 1;

FIG. 3 is a schematic illustration of the system of the present invention; and

FIG. 4 is a graphic illustration of the operation of the system of FIG. 3.

Turning now more specifically to FIG. 1, there is shown a schematic diagram of a flywheel system standby unit such as that shown in more detail in U.S. Patent No. 3,196,341, issued July 20, 1965.

Basically, this system consists of a standard motor-generator-engine combination 11, 13 and 15 having the usual clutch interconnecting the generator and the engine 15 through motor 13. As is well known in this type of system, upon failure of the normal power supply 12 the engine 15 will be actuated so as to continue to drive generator 11. A flywheel 21, which is operated at substantially twice the speed of the motor-generator system, is driven by means of a separate motor 23 and is coupled to the generator 11 by means of an electric clutch 25.

Under normal operating conditions, the motor generator operates from a commercial power supply and is run at a nominal speed such as 1,800 r.p.m. Flywheel 21 is also driven by the commercial power and is run at a speed such as 3,600 r.p.m. The electrical clutch 25 is disengaged and at the moment of power failure, when such power failure occurs, the generator, because of its lack of drive, starts to slow down. This is immediately sensed by the frequency or speed sensor 27 which partially energizes the electrical clutch 25 thereby partially coupling the flywheel 21 rotating 3,600 r.p.m. to the generator rotating at 1,800 r.p.m.

Under these conditions, clutch 25 must initially slip 1,800 r.p.m. As energy is taken from the flywheel 21 and its speed reduces, the clutch is "tightened" to reduce slippage between the flywheel and the generator thereby keeping the generator rotating at 1,800 r.p.m.

At some point in time, the engine 15 is started and is coupled into the system in the normal manner. One of the major objects of this particular system is that of having a flywheel operating at a higher speed which allows the use of a much smaller flywheel since the energy storing capacity of the flywheel is proportional to the square of its speed. Therefore, this system reduces the usual flywheel system problems such as bearings, weight, inertia and size.

One of the problems inherent with the system is that an electric clutch of the size required to use this unit as designed has a definite and somewhat lengthy lag, thereby creating a delay in the pickup of the load. As is illustrated in the graph of FIG. 2, this initially causes a sharp drop in the frequency where point X is the point of failure and the time $a$ is the clutch operating time. In an attempt to avoid this problem, the system as proposed maintains the clutch only partially energized at all times. This, in turn, throws an even heavier load on the sustaining motor and thus reduces the efficiency of the system.

Another problem involved in this system is one of cooling due to the intentional slippage of the electrical clutch. Large quantities of heat are generated and this heat must be dissipated. Therefore, there is a definite drop in system efficiency. However, after the initial problems are overcome, the system has a final control function that provides a very steady and smooth transfer of energy.

In order to avoid the above disadvantages, the present invention, as shown in FIG. 3, includes a hydrostatic transmission system 28 in association with the flywheel rather that the electrical clutch 25 and the separate electric motor 23 of the system shown in FIG. 1.

The basic system relating to the motor-generator-standby engine system of FIG. 3 is substantially the same as that shown in FIG. 1. The hydrostatic transmission system 28 is available commercially from various companies, such as the Hydroco Division of the New York Air Brake Conpany. Basically, this system consists of a fixed stroke hydraulic pump 29, a variable stroke hydraulic motor 31 and a stroke control 33. The fixed stroke hydraulic pump 29 is coupled to the generator 11 and the variable stroke hydraulic motor 31 is coupled to the flywheel 21. The stroke control 33 receives a signal from the sensor 27 by means of lead 35.

As above, it is assumed that the motor-generator-engine combination is operating at 1,800 r.p.m. with the fixed stroke hydraulic pump 29 coupled thereto. Hydraulically coupled to the displacement pump 29 is the variable stroke hydraulic motor 31 which is adjusted so as to drive the flywheel at 3,600 r.p.m.

To illustrate the principle of the invention, assume that the motor generator is rotating at 1,800 r.p.m. and the fixed displacement pump displaces .2 gal. per revolution. Accordingly, in one minute this pump will have displaced 1,800×.2 or 360 gals. of fluid. If this fluid is then passed through the variable stroke motor 31 that is coupled to the flywheel 21, and if the motor stroke is adjusted so as to displace .1 of a gal. per revolution, then obviously the flywheel must be rotated at 3,600 r.p.m. This is the condition that exists under normal operating conditions when the commercial power supply is being used.

However, if there is a failure of the commercial power supply, the flywheel 21 will continue to rotate and, in effect, the pump 31 will become a "motor" and the motor 29 will become a "pump." There will be an instant and smooth transfer of power from the flywheel and through the motor-pump combination to the generator with the result that the flywheel is then driving the generator at 1,800 r.p.m. Since the flywheel will gradually decrease in speed, the stroke control 33 gradually increases the stroke of the flywheel driven "pump" 31 at such a rate so as to keep the displacement of the flywheel driven "pump" times the flywheel speed equal to the fixed displacement of the generator hydraulic "motor" 29 times 1,800 r.p.m. Accordingly, the system maintains a smooth and constant speed of the generator 11.

When the flywheel speed is reduced to 1,800 r.p.m., the stroke of the flywheel "pump" 31 is identical to the generator hydraulic motor and both the flywheel and generator will be operating at 1,800 r.p.m. As the flywheel speed decreases below 1,800 r.p.m., to say 900 r.p.m., and the system is set to that displacement of the flywheel "pump" 31 is twice that of the generator "motor" 29, the generator speed will still be 1,800 r.p.m. This is a further advantage over the previously discussed system, since with the system of FIG. 1, the energy stored in the flywheel below 1,800 r.p.m. is of no value whereas in the system of the present invention this energy can be used even though the wheel is rotating at less than system speed. This, of course, means that for any given application a smaller and lighter wheel is required.

Additionally, since there are no intentional slippages, the system efficiency is kept relatively high and the means of controlling the stroke of the pump is relatively simple and reliable.

The operation of the system of FIG. 1, as shown in FIG. 2, results in a sudden dynamic change which requires a rate feedback to dampen out inherent oscillation of the system, thereby reducing gain and increasing error bandwidth.

In comparison, the generator speed for the system of FIG. 3 remains substantially even as shown in FIG. 4. The reason for this is that the hydraulic system of FIG. 3 is completely coupled for the proper speed with no requirement of a sudden dynamic change. Because the system of the present invention is inherently a slow reaction system, gain can be made high, thereby decreasing the error bandwidth. Accordingly, this system is of substantial importance for use with standby equipment which provides power to highly sensitive equipment such as used in many locations today.

Certain modifications and substitutions will be apparent from the above description, but such changes will not alter the concept as set forth above. Accordingly, the present invention is to be limited only by the scope of the following claims.

I claim:
1. A standby power generating system comprising, a motor-generator set,
means for connecting said motor generator set to a source of power,
a fuel powered engine,
means coupling said fuel powered engine to said generator upon malfunction of said source of power,
a fixed stroke hydraulic pump coupled to said generator,
a variable stroke hydraulic motor hydraulically coupled to said pump,
a flywheel system coupled to the output of said hydraulic motor, and
means coupled to the output of said generator for varying the stroke of said hydraulic motor in response to a variation in the output of said generator.

2. A standby power generating system comprising,
an electrical generator providing a power output having a preselected frequency,
a fixed stroke hydraulic pump mechanically coupled to said generator,
a variable stroke hydraulic motor hydraulically coupled to said pump,
a flywheel system mechanically coupled to said hydraulic motor, and
means coupled between said generator and said hydraulic motor for varying the stroke of said hydraulic motor in response to a variation in the output of said generator.

3. The power generating system of claim 2 wherein said flywheel system is normally driven at a rate substantially greater than the rate of operation of said generator.

4. The power generating system of claim 2 wherein said means coupled between said generator and said hydraulic motor comprises,
a frequency sensor coupled to the output of said generator, and
a mechanical stroke control connected to said hydraulic motor and responsive to the output of said frequency sensor.

5. A standby power generating system comprising,
an electrical generator providing a power output having a preselected frequency,
a flywheel system,
a hydrostatic transmission system including a pump means and a motor means,
means for mechanically coupling said pump to said generator and said motor to said flywheel system, and
sensing means coupled between the output of said generator and said motor for varying the fluid displacement of said motor in response to generator output fluctuations.

6. The system of claim 5 wherein said flywheel system is normally driven at a substantially greater rate than the normal rate of said generator.

7. The system of claim 5 wherein said motor means comprises,
a variable stroke hydraulic motor.

8. The system of claim 5 wherein said sensing means comprises,
a frequency sensor coupled to the electrical output of said generator.

References Cited
UNITED STATES PATENTS

| | | | |
|---|---|---|---|
| 3,196,341 | 7/1965 | Geib | 290—4 X |
| 3,283,165 | 11/1966 | Bloch | 290—4 |
| 3,345,517 | 10/1967 | Smith | 290—4 |
| 3,368,082 | 2/1968 | Oberlander | 290—4 |

ORIS L. RADER, Primary Examiner

H. HUBERFELD, Assistant Examiner

U.S. Cl. X.R.

74—665; 290—4, 30; 322—32